US009448727B2

(12) United States Patent
Auvenshine et al.

(10) Patent No.: US 9,448,727 B2
(45) Date of Patent: *Sep. 20, 2016

(54) FILE LOAD TIMES WITH DYNAMIC STORAGE USAGE

(71) Applicant: International Business Machines Corporation, Armonk, NY (US)

(72) Inventors: John J. Auvenshine, Tucson, AZ (US); Erik Bartholomy, Longmont, CO (US); John T. Olson, Tucson, AZ (US); Nedzad Taljanovic, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/967,778

(22) Filed: Dec. 14, 2015

(65) Prior Publication Data

US 2016/0098205 A1 Apr. 7, 2016

Related U.S. Application Data

(63) Continuation of application No. 13/956,839, filed on Aug. 1, 2013, now Pat. No. 9,244,624.

(51) Int. Cl.
*G06F 12/08* (2016.01)
*G06F 3/06* (2006.01)

(52) U.S. Cl.
CPC ............ *G06F 3/0604* (2013.01); *G06F 3/064* (2013.01); *G06F 3/0643* (2013.01); *G06F 3/0683* (2013.01); *G06F 12/0804* (2013.01); *G06F 2212/1016* (2013.01); *G06F 2212/60* (2013.01)

(58) Field of Classification Search
CPC ... G06F 3/0604; G06F 3/0643; G06F 3/0683
See application file for complete search history.

(56) References Cited

U.S. PATENT DOCUMENTS

| 8,402,239 | B2 | 3/2013 | Kobayashi |
| 2010/0088459 | A1 | 4/2010 | Arya et al. |
| 2011/0246821 | A1 | 10/2011 | Eleftheriou et al. |
| 2015/0039831 | A1 | 2/2015 | Auvenshine et al. |

OTHER PUBLICATIONS

Exparte Quayle Action dated May 21, 2015, pp. 7, for U.S. Appl. No. 13/956,839, filed Aug. 1, 2013.
Amendment dated Jul. 21, 2015, pp. 9, to Exparte Quayle Action dated May 21, 2015, for U.S. Appl. No. 13/956,839, filed Aug. 1, 2013.
Notice of Allowance dated Sep. 17, 2015, pp. 9, for U.S. Appl. No. 13/956,839, filed Aug. 1, 2013.

*Primary Examiner* — Yong Choe
(74) *Attorney, Agent, or Firm* — Janaki K. Davda; Konrad Raynes Davda & Victor LLP

(57) ABSTRACT

Provided is a technique for improving file load times with dynamic storage usage. A file made up of data blocks is received. A list of storage devices is retrieved. In one or more iterations, the data blocks of the file are written by: updating the list of storage devices by removing any storage devices with insufficient space to store additional data blocks; generating a performance score for each of the storage devices in the updated list of storage devices; determining a portion of the data blocks to be written to each of the storage devices based on the generated performance score for each of the storage devices; writing, in parallel, the determined portion of the data blocks to each of the storage devices; and recording placement information indicating the storage devices to which each determined portion of the data blocks was written.

18 Claims, 7 Drawing Sheets ns, to perform: receiving a file made up of data blocks; retrieving a list of storage devices; and, in one or more iterations, writing the data blocks of the file by: updating the list of storage devices by removing any storage devices with insufficient space to store additional data blocks; generating a performance score for each of the storage devices in the updated list of storage devices; determining a portion of the data blocks to be written to each of the storage devices based on the generated performance score for each of the storage devices; writing, in parallel, the determined portion of the data blocks to each of the storage devices; and recording placement information indicating the storage devices to which each determined portion of the data blocks was written.

FILE LOAD TIMES WITH DYNAMIC STORAGE USAGE

FIELD

Embodiments of the invention relate to improving file load times with dynamic storage usage.

BACKGROUND

In modern computers, local disk Input/Output (I/O) is often a bottleneck in the execution of a program when the processor blocked waiting for I/O access to read program files that are used to continue execution. In such cases, the processor may not be fully utilized. From the user perspective, this problem translates to long loading times. These delays are especially noticeable when several programs are starting simultaneously during boot-up.

Some current solutions include: using higher performance disk drives and using Redundant Array of Independent Disks (RAID) controllers for parallel access. These solutions require expensive hardware and a high level of technical expertise to implement.

SUMMARY

Provided is a method for improving file load times with dynamic storage usage. A file made up of data blocks is received. A list of storage devices is retrieved. In one or more iterations, the data blocks of the file are written by: updating the list of storage devices by removing any storage devices with insufficient space to store additional data blocks; generating a performance score for each of the storage devices in the updated list of storage devices; determining a portion of the data blocks to be written to each of the storage devices based on the generated performance score for each of the storage devices; writing, in parallel, the determined portion of the data blocks to each of the storage devices; and recording placement information indicating the storage devices to which each determined portion of the data blocks was written.

Provided is a computer program product for improving file load times with dynamic storage usage. The computer program product comprises a computer readable storage medium having program code embodied therewith, the program code executable by at least one processor to perform: receiving a file made up of data blocks; retrieving a list of storage devices; and, in one or more iterations, writing the data blocks of the file by: updating the list of storage devices by removing any storage devices with insufficient space to store additional data blocks; generating a performance score for each of the storage devices in the updated list of storage devices; determining a portion of the data blocks to be written to each of the storage devices based on the generated performance score for each of the storage devices; writing, in parallel, the determined portion of the data blocks to each of the storage devices; and recording placement information indicating the storage devices to which each determined portion of the data blocks was written.

Provided is a computer system for improving file load times with dynamic storage usage. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform: receiving a file made up of data blocks; retrieving a list of storage devices; and, in one or more iterations, writing the data blocks of the file by: updating the list of storage devices by removing any storage devices with insufficient space to store additional data blocks; generating a performance score for each of the storage devices in the updated list of storage devices; determining a portion of the data blocks to be written to each of the storage devices based on the generated performance score for each of the storage devices; writing, in parallel, the determined portion of the data blocks to each of the storage devices; and recording placement information indicating the storage devices to which each determined portion of the data blocks was written.

BRIEF DESCRIPTION OF THE SEVERAL VIEWS OF THE DRAWINGS

In the drawings, like reference numbers represent corresponding parts throughout.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
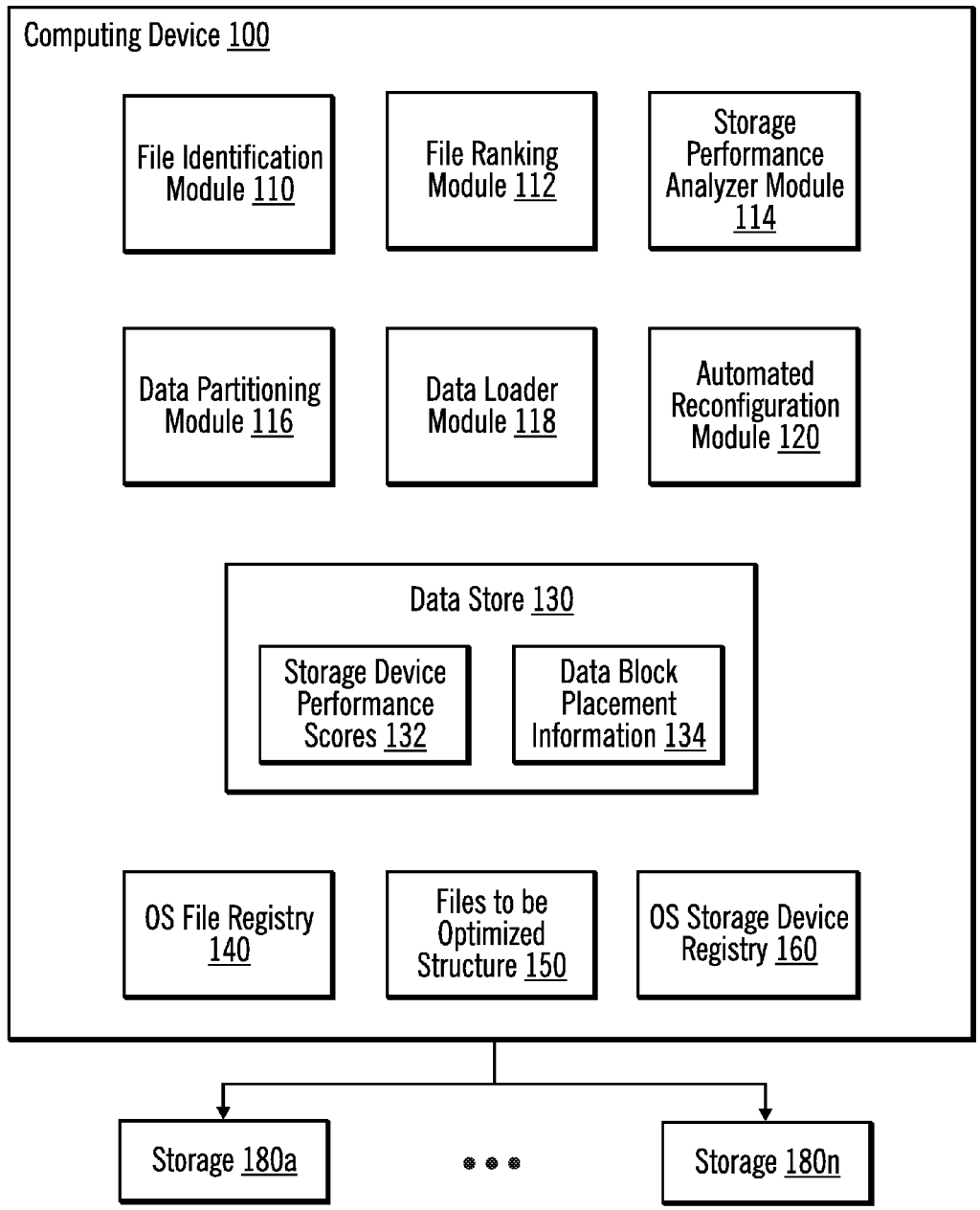
FIG. 1 illustrates, in a block diagram, a computing environment in accordance with certain embodiments.

FIG. 1 illustrates, in a block diagram, a computing environment in accordance with certain embodiments. A computing device 100 is coupled to storage devices 180a . . . 180n (where the ellipses indicate that there may any number and type of storage devices). In certain embodiments, each of the storage devices 180a . . . 180n may be different types of storage devices. In certain embodiments, subsets of the storage devices 180a . . . 180n are different types of storage devices. Examples of storage devices 180a . . . 180n include Hard Disk Drives (HDDs), Universal Serial Bus (USB) flash drives, Secure Digital (SD) cards, tape drives, non-volatile Random Access Memory (RAM), optical drives, Network Attached Storage (NAS), Storage Area Network (SAN), cloud devices, etc.

The computing device 100 includes file identification module 110, file ranking module 112, storage performance analyzer module 114, data partitioning module 116, data loader module 118, and automated reconfiguration module 120. The computing device 100 also includes a data store 130 (e.g., a database), an Operating System (OS) file registry 140, a files to be optimized structure 150, and an OS storage device registry 160. The data store 130 includes storage device performance scores 132 and data block placement information 134. In certain embodiments, one or more files are associated with a program, and the OS file registry 140 is an "OS program registry".

In alternative embodiments, the modules 110, 112, 114, 116, 118, 120 (either individually or in subsets) may be at different computing devices and communicate with each other. In certain embodiments, modules 110, 112, 114, 116, 118, 120 are part of one program. In alternative embodiments, modules 110, 112, 114, 116, 118, 120 are (either individually or in subsets) separate programs.

Embodiments automatically partition and relocate files pertaining to a program or a data set across available storage devices 180a ... 180n in a manner that optimizes file loading times. In certain embodiments, a program has multiple files associated with that program, and embodiments treat these multiple files in the same manner. Since each file is distributed as data blocks across multiple storage devices 180a ... 180n, accesses to different storage devices 180a ... 180n may be done in parallel to reduce the I/O time of accessing the data blocks of the file. In certain embodiments, the number of data blocks placed on each storage device 180a ... 180n for the file is proportional to the storage device's performance.

In certain embodiments, the file is a program file. In certain embodiments, access to other types of data and files is optimized when a registry for that type of data is created by techniques known in the art (e.g., registry keys in Microsoft® Windows® operating system). Microsoft and Windows are trademarks or registered trademarks of Microsoft Corporation in the United States and/or other countries.

With the file identification module 110, a user is able to identify which files are to be optimized for loading times. In certain embodiments, the file identification module 110 may be configured to allow the user to select from a list of installed files. In certain embodiments, the file identification module 110 may monitor loaded files during a set time interval and add those files to the list of selected files to be optimized.

The file ranking module 112 ranks files in an order in which they are to be optimized. In certain embodiments, all files may not be able to be optimized equally. For example, this may be due to limited space being available on higher performing storage devices 180a ... 180n. The file ranking module 112 allows the user to specify a ranking list (also referred to as an ordered list) in which higher ranked files are given higher priority in the data partitioning module 116. In certain embodiments, files with higher priority are partitioned and stored on the storage devices 180a ... 180n before files with lower priority. The file ranking module 112 may also be configured to monitor usage statistics and to readjust the ordering of the ranking list to give more frequently used files a higher ranking.

The storage performance analyzer module 114 conducts performance tests on the available storage devices 180a ... 180n. Metrics, such as sequential read performance and random access read performance, are collected and stored for each storage device 180a ... 180n. The metrics are passed through a function to derive a numeric value that represents the performance score for each storage device 180a ... 180n. Different functions may be used in various embodiments. The storage device performance score 132 may be stored in the data store 130.

One example of a function may be:

Drive Performance=sequential read performance in megabytes (MB/s)+random access read performance in megabytes (MB/s)

Another example of a function may be:

Drive Performance=sequential read rate of the storage device in MB/s*100+the random access read operations per second (which are the Input/Output Operations per Second (IOPs))

Figure 5:
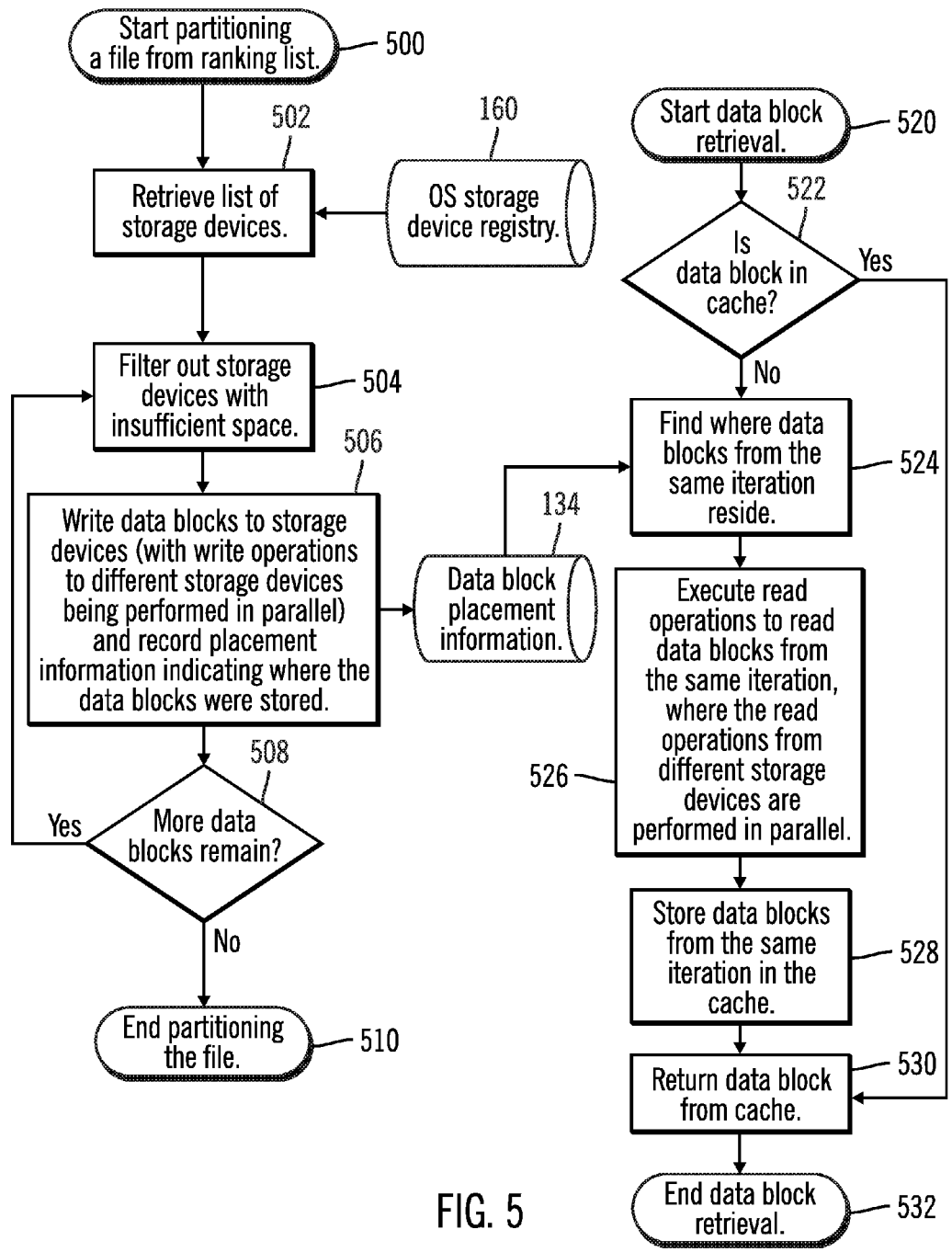
FIG. 5 illustrates, in a flow diagram, operations performed by a data partitioning module and a data loader module in accordance with certain embodiments.

The performance score is used to determine how many data blocks are written to each storage device (in block 506 of FIG. 5). Embodiments write one data block (call it X) to the slowest storage device and k*X data blocks to a faster storage device, such that the time it takes to read X data block from the slower storage device is greater or equal to the time it takes to read k*X data blocks from the faster storage device. Thus, embodiments may read one data block from the slowest storage device, while, in parallel, also retrieving k data blocks from the faster storage device (during a same or similar period of time).

The data partitioning module 116 partitions each file across the available storage devices 180a ... 180n. The data partitioning module 116 processes files according to the ranking assigned in the file ranking module 112. In certain embodiments, a file is partitioned in data blocks of a configurable size (e.g., 512 kilobytes by default). In certain embodiments, the data blocks are written in a round-robin fashion across the available storage devices 180a ... 180n. For example, in one iteration, a single data block is written to the lowest performing storage device. Then, the number of data blocks written to another storage device O is:

floor(<performance of O>/<performance of slowest storage device>).

For example, imagine there were three available storage devices A, B and C with performance 2, 4 and 5 respectively. During an iteration, one data block is written to storage device A and two data blocks are written to storage devices B and C. The address of each data block is recorded as data block placement information 134 in the data store 130. When a storage device is out of space or reaches a configurable utilization threshold, that storage device is excluded from further iterations.

Because the performance evaluation functions differ with embodiments, the floor function may also differ. In certain embodiments, the assumption for using the floor function is that a higher value means higher performance.

In certain embodiments, the data partitioning module 116 may be configured to record parity data (such as is done in RAID 5 devices) to allow for operating without one or more storage devices. In other embodiments, the data partitioning module 116 keeps a complete copy of the file on the original storage device 180a ... 180n. Data blocks that would be written to that storage device 180a ... 180n are not actually written, since they already exist in the original file, and the locations of those blocks have been recorded in the data block placement information 134.

The data loader module 118 reconstructs a file that is striped across multiple storage devices 180a ... 180n. To retrieve a certain location in the file, the data loader module 118 uses the data block placement information 134 in the data store 130 that is also used by the data partitioning module 116 to locate the required data block. A read operation is executed on all the data blocks that were written during the same round-robin iteration in the data partitioning module 116. The data loader module 118 may be further configured to do additional asynchronous pre-fetching of data blocks to be read in consecutive iterations.

The automated reconfiguration module 120 may perform some reconfiguration because the files a user loads may change over time. Then, embodiments re-partition if the block placement would be different after reconfiguration. For example, a user may switch to another preferred web browser. Even though both an old web browser and a newer web browser exist on a storage device 180a . . . 180n, the load optimization may change to give the frequently used file higher performance. To adapt to the new usage patterns, the automated reconfiguration module 120 monitors the usage of files over a configurable time period (e.g., one month by default).

In certain embodiments, if there is sufficient space on all drives for all files in a given category, then any ranking will actually result in the same placement of blocks with respect to the different storage devices. In certain embodiments, if the usage frequency results are different from the ranking list in the file ranking module 112, the ranking list is adjusted (re-ordered) to reflect the new usage patterns. If the ranking list has changed, then the files are reconstructed using the data loader module 118, and then re-partitioned according to their new priority using the data partitioning module 116. In certain embodiments, this process is done during times when the computing device 100 is idle. If the entire file is kept on the original drive, then no reconstruction is needed, and the partitioning can be done from the original file.

As described herein, some modules may be "configured". Such configuration may be performed by, for example, a system administrator or other user. Merely to enhance understanding, examples are provided herein.

In one example, consider a computing device with a Solid-State Drive (SSD), Hard Disk Drive (HDD), and a USB flash drive. For this example, the read speeds and performance ratings are as follows:
SSD: 450 MB/s, rating 6
HDD: 150 MB/s, rating 2
USB: 75 MB/s, rating 1

Continuing with the example, a program (which is a type of file) that normally resides on the SSD is read at a speed of 450 MB/s. If the program is striped across all three available drives (according to the technique used by the data partitioning module 116), then the effective read speed approaches 675 MB/s. In the time spent waiting for 6 data blocks to be read from the SSD, an additional 2 data blocks would be read from the HDD and 1 data block would be read from the USB flash drive. Even though the other drives are slower in comparison to the SSD, this process still yields a 50% improvement over just utilizing the faster SSD. Now, consider that the USB flash drive is fully utilized and striping may only be done on the SSD and HDD. The effective read speed would approach 600 MB/s, which still represents a 33% improvement over only reading from the faster SSD.

Figure 2:
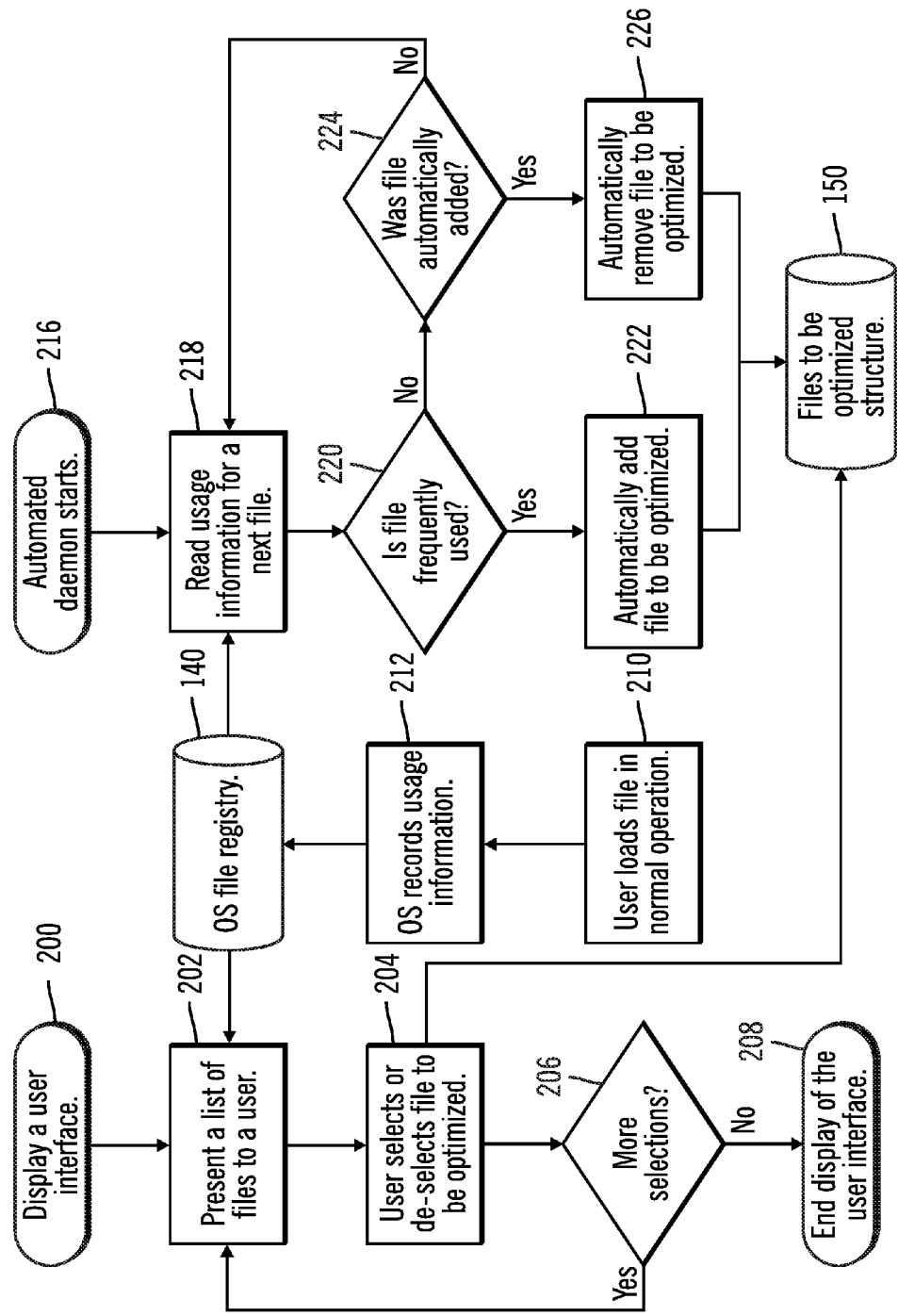
FIG. 2 illustrates, in a flow diagram, operations performed by a file identification module in accordance with certain embodiments.

FIG. 2 illustrates, in a flow diagram, operations performed by the file identification module 110 in accordance with certain embodiments. In block 210, a user loads a file in normal operation. In block 212, the Operating System (OS) records usage information into an OS file registry 140. In certain embodiments, the usage information indicates how often the file is accessed.

Also in FIG. 2, in block 200, the file identification module 110 displays a user interface. In block 202, the file identification module 110 presents a list of files to the user in the user interface (based on the information about files stored in the OS file registry 140). In block 204, the user selects and/or de-selects a file to be optimized using the user interface, and the selected file to be optimized is stored in a files to be optimized structure 150. In block 206, the file identification module 110 determines whether there are more selections (block 206). If so, processing continues to block 202, otherwise, processing continues to block 208. In block 208, the file identification module 110 ends display of the user interface.

In block 216, the file identification module 110 starts an automated daemon. The automated daemon processes files available to the computing device 100 and that are identified in the OS file registry 140. In block 218, the daemon reads usage information for a next file, starting with a first file from the OS file registry 140. In block 220, the daemon determines whether the file is frequently used. If so, processing continues to block 222, otherwise, processing continues to block 224. In various embodiments, "frequently used" may refer to a time frequency (e.g., once per day) or a relative access frequency compared to other files (e.g., top 10% of all files). In block 220, the file is automatically added to the files to be optimized structure 150. In block 224, the daemon determines whether the file was automatically added. If so, processing continues to block 226, otherwise, processing continues to block 218 to read usage information for another file. In block 226, the file is automatically removed from the files to be optimized structure 150. This allows user added files to be left in the files to be optimized structure 150, even if those files are not used frequently.

Figure 3:
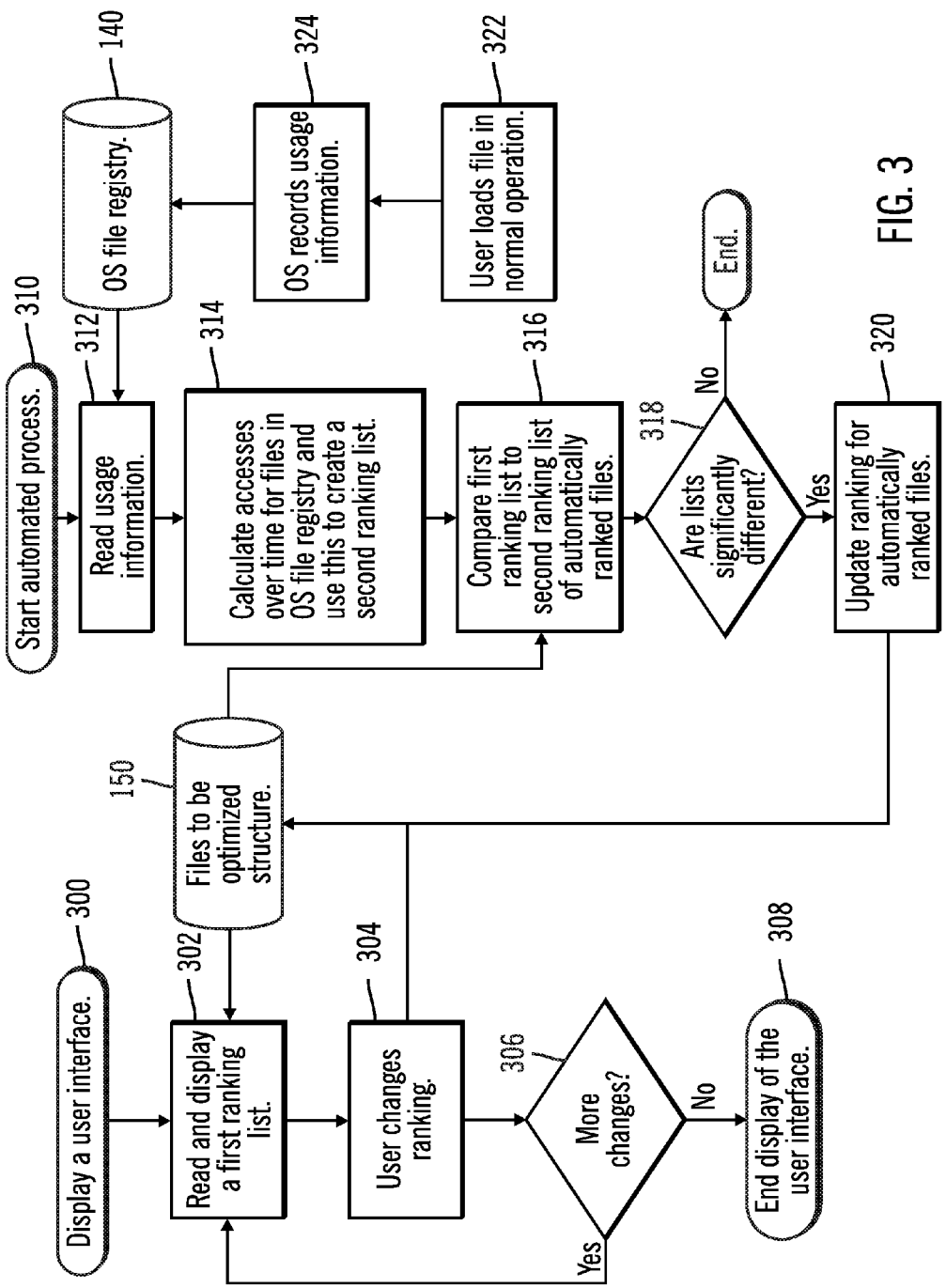
FIG. 3 illustrates, in a flow diagram, operations performed by a file ranking module in accordance with certain embodiments.

FIG. 3 illustrates, in a flow diagram, operations performed by the file ranking module 112 in accordance with certain embodiments. In block 300, the file ranking module 112 displays a user interface. In block 302, the file ranking module 112 reads from the files to be optimized structure 150 and displays a first (e.g., a current) ranking list of files. In block 304, the user changes the ranking of the first ranking list, and this forms a second ranking list in the files to be optimized structure 150. The first ranking list and second ranking list are compared and processed in blocks 316, 318, and 320, which are discussed in further detail below. In block 306, the file ranking module 112, determines whether the user wants to make more changes. If so, processing continues to block 302, otherwise, processing continues to block 308. In block 308, the file ranking module 112 ends display of the user interface.

In block 322, the user loads a file in normal operation. In block 324, the Operating System (OS) records usage information into an OS file registry 140.

In block 310, the file ranking module 112 starts an automated process. In block 312, the automated process reads usage information from the OS file registry 140. In block 314, the automated process calculates (e.g., using an Exponential Moving Average (EMA)) accesses over time for the files in the OS file registry 140 and uses this to form a second ranking list. An EMA may be described as a type of filter that applies weighting factors that decrease exponentially. Thus, more recent activity and more frequently used files are favored. In block 316, the automated process compares the order of files in the first ranking list and the second ranking list of automatically ranked files. The second ranking list may have been manually created by the user or automatically created in block 314. In block 318, the automated process determines whether the first ranking list and the second ranking list are significantly different. If so, processing continues to block 320, otherwise, processing ends. In block 320, the automated process updates ranking for automatically ranked files. In certain embodiments, a significant difference is defined as a ranking that would result in a different placement of data blocks in the storage devices.

In certain embodiments, the file ranking module 112 uses a technique to arbitrate between user-specified and automatically-calculated file ranking. In certain embodiments, N ranking categories are defined. For example, if the ranking categories are "high", "medium", and "low", N=3. A common 5-star ranking system may also be used where N=5. When the user ranks a file, the user assigns the file to one of the N ranking categories. A sorted list of automatically ranked files may also be divided into N equal parts, where each sub-list represents members of one of the N categories. The order within a sub-list is preserved. A file that was assigned a user ranking is moved to the front of the list of files within that category. The categories are processed from higher to lower priority. Files within a category are processed in the ranking order. In another embodiment, files within a category are treated as a single file. In that embodiment, better placement positions are shared equally by the files within the category, instead of giving priority to higher ranked files.

Figure 4:
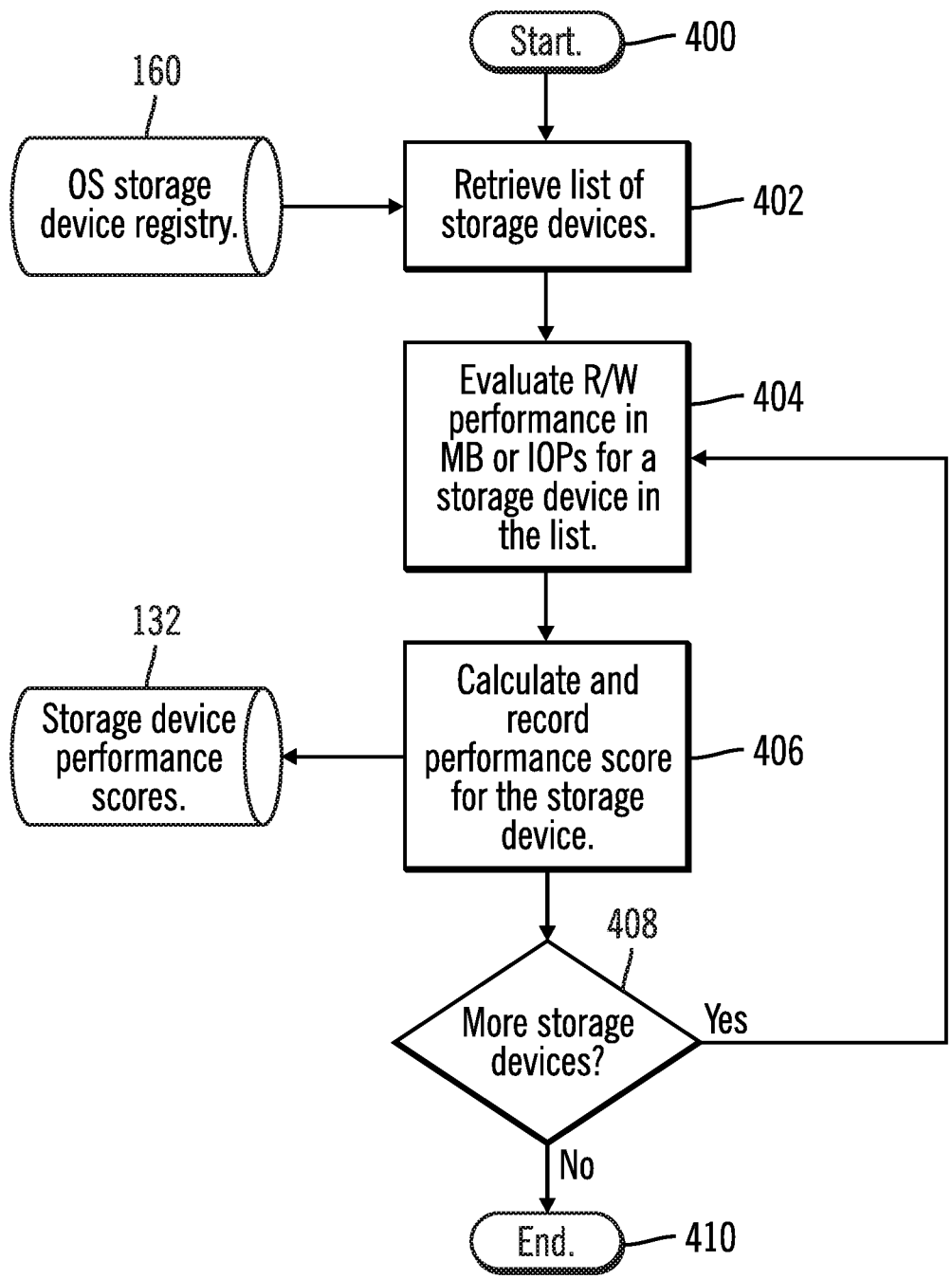
FIG. 4 illustrates, in a flow diagram, operations performed by a storage performance analyzer module in accordance with certain embodiments.

FIG. 4 illustrates, in a flow diagram, operations performed by the storage performance analyzer module 114 in accordance with certain embodiments. In block 400, the storage performance analyzer module 114 starts. In block 402, the storage performance analyzer module 114 retrieves (e.g., reads) a list of storage devices from the OS storage device registry 160. In certain embodiments, a list of all storage devices is retrieved. In certain embodiments, a subset of storage devices selected by a user is retrieved. In block 404, the storage performance analyzer module 114 evaluates Read/Write (R/W) performance in Megabytes (MBs) or Input/Output Operations per Second (IOPs) for a storage device in the list of storage devices, starting with a first storage device. In block 406, the storage performance analyzer module 114 calculates and records a performance score for the storage device into the storage device performance scores 132. In block 408, the storage performance analyzer module 114 determines whether there are more storage devices in the list of storage devices to process. If so, processing continues to block 404 to process a next storage device, otherwise, processing ends (block 410).

FIG. 5 illustrates, in a flow diagram, operations performed by the data partitioning module 116 and the data loader module 118 in accordance with certain embodiments. In block 500 the data partitioning module 116 starts partitioning one file (e.g., an actual file or a category) from a ranking list (e.g., the current ranking list). In block 502, the data partitioning module 116 retrieves (e.g., reads) a list of storage devices from the OS storage device registry 160. In certain embodiments, a list of all storage devices is retrieved. In certain embodiments, a subset of storage devices selected by a user is retrieved. In block 504, the data partitioning module 116 filters out (removes) storage devices with insufficient space. In certain embodiments, insufficient space is defined by a threshold, and a storage device that has free space that is less than the threshold is filtered out. Examples of thresholds include 10% free space or 100 MB free space. In certain embodiments, the default threshold is 5% free space.

In block 506, the data partitioning module 116 writes data blocks to storage devices (where write operations to different storage devices are performed in parallel) and records placement information indicating where the data blocks were stored in the data block placement information 134. In block 506, the performance score is used to determine how many data blocks (e.g., which portion of data blocks making up a file) are written to each storage device. In block 508, the data partitioning module 116 determines whether there are more data blocks in the file to be processed. If so, processing continues to block 504, otherwise, processing ends (block 510).

Also in FIG. 5, in block 520, the data loader module 118 starts data block retrieval. In block 522, the data loader module 118 determines whether the data block is in cache. If so, processing continues to block 530, otherwise, processing continues to block 524. In block 524, the data loader module 118 finds where the data blocks from the same iteration (e.g., data blocks written in block 506) reside using the data block placement information 134. For example, one iteration refers to an iteration of the round-robin example provided above. In block 526, the data loader module 118 executes read operations to read the data blocks from the same iteration. In certain embodiments, the read operations against different storage devices are performed in parallel. In block 528, the data loader module 118 stores the data blocks from the same iteration in the cache. In block 530, the data loader module 118 returns the data block from the cache. Then, data block retrieval ends (block 532).

Thus, embodiments, in one or more iterations, write the data blocks of a file by: updating the list of storage devices by removing any storage devices with insufficient space to store additional data blocks; generating a performance score for each of the storage devices in the updated list of storage devices; determining a portion of the data blocks to be written to each of the storage devices based on the generated performance score for each of the storage devices; writing, in parallel, the determined portion of the data blocks to each of the storage devices; and recording placement information indicating the storage devices to which each determined portion of the data blocks was written. In certain embodiments, "portion" indicates a number of the data blocks, such as one or more.

Figure 6:
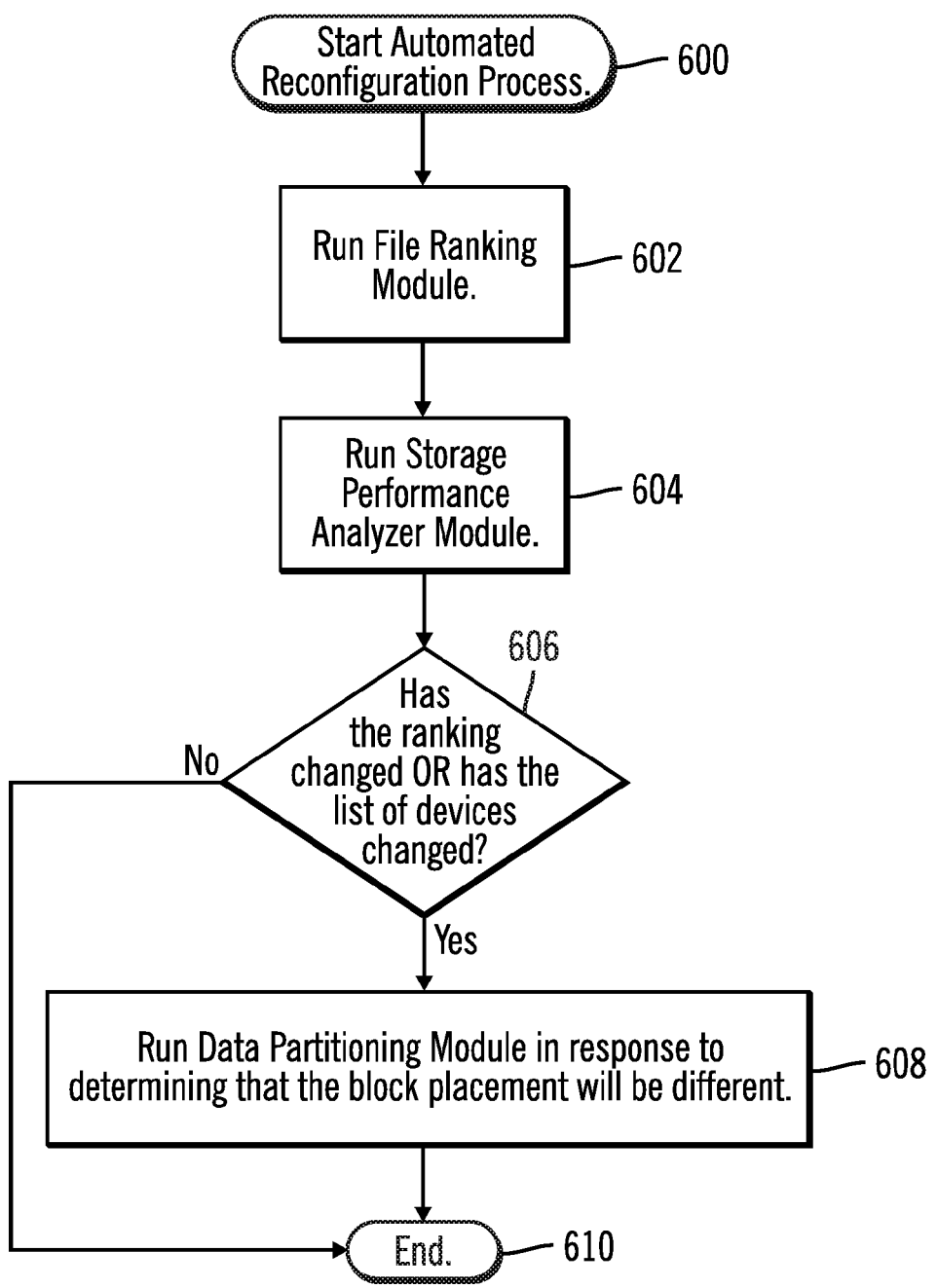
FIG. 6 illustrates, in a flow diagram, operations performed by an automated reconfiguration module in accordance with certain embodiments.

FIG. 6 illustrates, in a flow diagram, operations performed by the automated reconfiguration module 120 in accordance with certain embodiments. In block 600, the automated reconfiguration module 120 starts the automated reconfiguration process. In block 602, the automated reconfiguration module 120 runs the file ranking module 12 to obtain a new ranking list. In block 604, the automated reconfiguration module 120 runs the storage performance analyzer module 114. In block 606, the automated reconfiguration module 120 determines whether the ranking has changed (between the new ranking list and a previous ranking list) or whether the list of storage devices has changed. If so, processing continues to block 608, otherwise, processing ends (block 610). In block 608, the automated reconfiguration module 120 runs the data partitioning module 116 in response to determining that the block placement will be different. Then, processing ends (block 610).

Thus, embodiments use multiple different types of storage devices, evaluate the performance of the storage devices, and rank files to be stored on the storage devices, integrating a user selected priority for that file with frequency of access of that file. Embodiments simultaneously read different data blocks from more than one storage device, up to and including all of the available storage devices, in parallel to retrieve an entire file, where aggregated performance on the file can exceed the maximum performance of the fastest storage device attached to the single host. Embodiments write only some data blocks to storage devices in proportion to a performance function relevant to the storage device and the file's usage. Embodiments read data blocks from the storage devices in proportion to the performance of each storage device, so even a slower device can assist in boosting overall performance of the system.

Embodiments do not require the user to buy expensive high-performance hardware, do not require a high level of technical expertise, and may be configured by software developers to work automatically requiring no end-user involvement. In addition, embodiments, adapt to changes in usage patterns and adapt to changes in available storage devices $180a \ldots 180n$.

Embodiments reduce the amount of time spent waiting for local disk I/O and reduce file (e.g., program) loading times. Embodiments may be configured to work without any end-user inputs and utilize the hardware that is already available (e.g., existing storage). Thus, embodiments automatically improve file load times with dynamic storage usage.

Moreover, embodiments partition and relocate files to optimize loading time of the files. In particular, embodiments store portions of a file over multiple devices according to file priority and storage device performance to access the file in parallel from the multiple devices.

Additional Embodiment Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flow diagram (e.g., flowchart) illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowcharts illustration, and combinations of blocks in the block diagrams and/or flowcharts illustration, can be implemented by special purpose hardware-based systems that perform the specified functions or acts, or combinations of special purpose hardware and computer instructions.

In addition, the illustrated operations of the flow diagrams and block diagrams show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

The code implementing the described operations may further be implemented in hardware logic or circuitry (e.g., an integrated circuit chip, Programmable Gate Array (PGA), Application Specific Integrated Circuit (ASIC), etc. The hardware logic may be coupled to a processor to perform operations.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Figure 7:
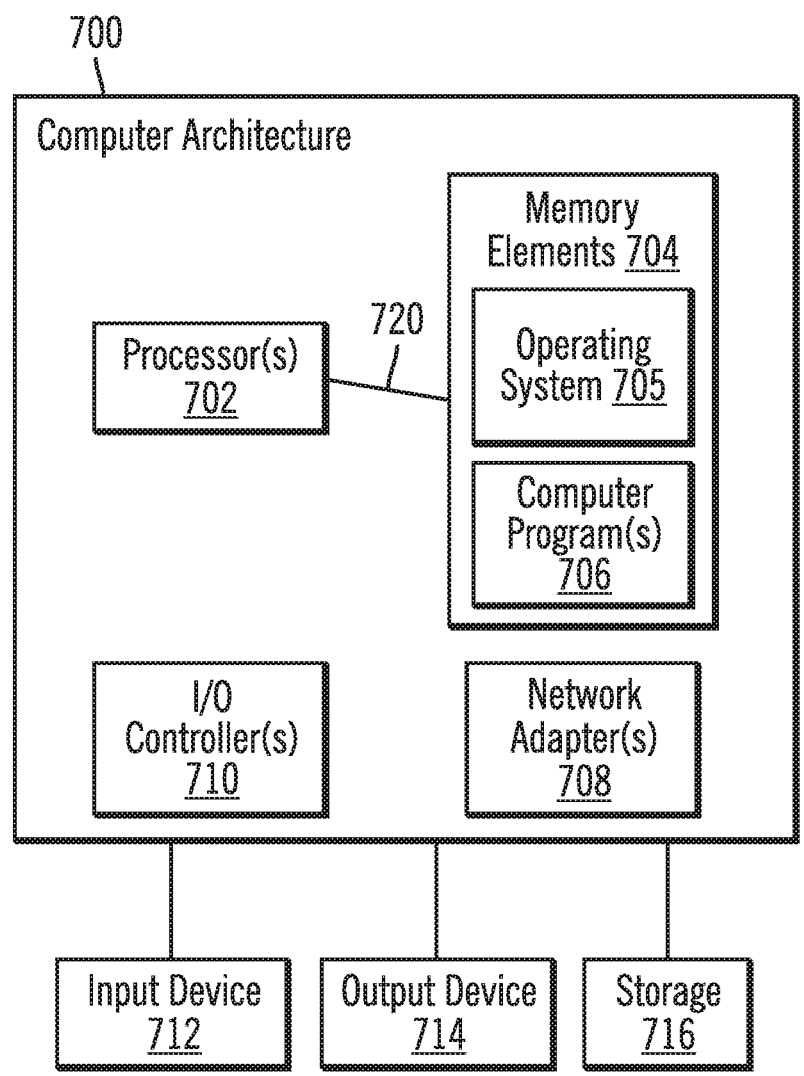
FIG. 7 illustrates, in a block diagram, a computer architecture that may be used in accordance with certain embodiments.

FIG. 7 illustrates a computer architecture 700 that may be used in accordance with certain embodiments. In certain embodiments, computing device 100 may implement computer architecture 700. The computer architecture 700 is suitable for storing and/or executing program code and includes at least one processor 702 coupled directly or indirectly to memory elements 704 through a system bus 720. The memory elements 704 may include local memory employed during actual execution of the program code, bulk storage, and cache memories which provide temporary storage of at least some program code in order to reduce the number of times code must be retrieved from bulk storage during execution. The memory elements 704 include an operating system 705 and one or more computer programs 706.

Input/Output (I/O) devices 712, 714 (including but not limited to keyboards, displays, pointing devices, etc.) may be coupled to the system either directly or through intervening I/O controllers 710.

Network adapters 708 may also be coupled to the system to enable the data processing system to become coupled to other data processing systems or remote printers or storage devices through intervening private or public networks. Modems, cable modem and Ethernet cards are just a few of the currently available types of network adapters 708.

The computer architecture 700 may be coupled to storage 716 (e.g., any type of storage device; a non-volatile storage area, such as magnetic disk drives, optical disk drives, a tape drive, etc.). The storage 716 may comprise an internal storage device or an attached or network accessible storage. Computer programs 706 in storage 716 may be loaded into the memory elements 704 and executed by a processor 702 in a manner known in the art.

The computer architecture 700 may include fewer components than illustrated, additional components not illustrated herein, or some combination of the components illustrated and additional components. The computer architecture 700 may comprise any computing device known in the art, such as a mainframe, server, personal computer, workstation, laptop, handheld computer, telephony device, network appliance, virtualization device, storage controller, etc.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the invention, the embodiments reside in the claims hereinafter appended or any subsequently-filed claims, and their equivalents.

What is claimed is:

1. A method, comprising:
   retrieving, with a processor of a computer, a list of storage devices; and
   in one or more iterations, writing data blocks of a file by:
      updating the list of storage devices by removing any storage devices with insufficient space to store additional data blocks;
      generating a performance score for each of the storage devices in the updated list of storage devices;
      determining a portion of the data blocks to be written to each of the storage devices based on the generated performance score for each of the storage devices;
      writing, in parallel, the determined portion of the data blocks to each of the storage devices; and
      recording placement information indicating the storage devices to which each determined portion of the data blocks was written.

2. The method of claim 1, further comprising:
   in response to a request to retrieve a data block that is not stored in cache, retrieving the placement information indicating the storage devices to which each determined portion of the data blocks was written for one iteration, wherein the data block to be retrieved is included in a determined portion of the data blocks; and
   executing a read operation to read each determined portion of the data blocks from each of the storage devices in parallel; and
   placing each determined portion of the data blocks in a cache.

3. The method of claim 1, wherein a storage device in the list of storage devices has insufficient space when the storage device has free space that is less than a threshold.

4. The method of claim 1, further comprising:
   receiving user input to add one or more files to an optimized structure; and
   for each file in a list of files that are available,
      in response to determining that the file is frequently used, automatically adding that file to the optimized structure; and
      in response to determining that the file is not frequently used and was previously automatically added to the optimized structure, removing that file from the optimized structure.

5. The method of claim 1, further comprising:
   for each file in a list of files that are available,
      calculating accesses over time; and
      updating a ranking of automatically added files based on the calculated accesses and user assigned categories.

6. The method of claim 1, further comprising:
   in response to determining that block placement is to change, performing automatic reconfiguration.

7. A computer program product, the computer program product comprising a non-transitory computer readable storage medium having program code embodied therewith, the program code executable by at least one processor to perform:
   retrieving a list of storage devices; and
   in one or more iterations, writing data blocks of a file by:
      updating the list of storage devices by removing any storage devices with insufficient space to store additional data blocks;
      generating a performance score for each of the storage devices in the updated list of storage devices;
      determining a portion of the data blocks to be written to each of the storage devices based on the generated performance score for each of the storage devices;
      writing, in parallel, the determined portion of the data blocks to each of the storage devices; and
      recording placement information indicating the storage devices to which each determined portion of the data blocks was written.

8. The computer program product of claim 7, wherein the program code is executable by the at least one processor to perform:
   in response to a request to retrieve a data block that is not stored in cache, retrieving the placement information indicating the storage devices to which each determined portion of the data blocks was written for one iteration, wherein the data block to be retrieved is included in a determined portion of the data blocks; and
   executing a read operation to read each determined portion of the data blocks from each of the storage devices in parallel; and
   placing each determined portion of the data blocks in a cache.

9. The computer program product of claim 7, wherein a storage device in the list of storage devices has insufficient space when the storage device has free space that is less than a threshold.

10. The computer program product of claim 7, wherein the program code is executable by the at least one processor to perform:
   receiving user input to add one or more files to an optimized structure; and
   for each file in a list of files that are available,
      in response to determining that the file is frequently used, automatically adding that file to the optimized structure; and in response to determining that the file is not frequently used and was previously automatically added to the optimized structure, removing that file from the optimized structure.

11. The computer program product of claim 7, wherein the program code is executable by the at least one processor to perform:
for each file in a list of files that are available,
calculating accesses over time; and
updating a ranking of automatically added files based on the calculated accesses and user assigned categories.

12. The computer program product of claim 7, wherein the program code is executable by the at least one processor to perform:
in response to determining that block placement is to change, performing automatic reconfiguration.

13. A computer system, comprising:
one or more processors, one or more computer-readable memories and one or more computer-readable, tangible storage devices; and
program instructions, stored on at least one of the one or more computer-readable, tangible storage devices for execution by at least one of the one or more processors via at least one of the one or more memories, to perform:
retrieving a list of storage devices; and
in one or more iterations, writing data blocks of a file by:
updating the list of storage devices by removing any storage devices with insufficient space to store additional data blocks;
generating a performance score for each of the storage devices in the updated list of storage devices;
determining a portion of the data blocks to be written to each of the storage devices based on the generated performance score for each of the storage devices;
writing, in parallel, the determined portion of the data blocks to each of the storage devices; and
recording placement information indicating the storage devices to which each determined portion of the data blocks was written.

14. The computer system of claim 13, wherein the program instructions are stored on the at least one of the one or more storage devices for execution by the at least one of the one or more processors via the at least one of the one or more memories to perform:
in response to a request to retrieve a data block that is not stored in cache, retrieving the placement information indicating the storage devices to which each determined portion of the data blocks was written for one iteration, wherein the data block to be retrieved is included in a determined portion of the data blocks; and
executing a read operation to read each determined portion of the data blocks from each of the storage devices in parallel; and
placing each determined portion of the data blocks in a cache.

15. The computer system of claim 13, wherein a storage device in the list of storage devices has insufficient space when the storage device has free space that is less than a threshold.

16. The computer system of claim 13, wherein the program instructions are stored on the at least one of the one or more storage devices for execution by the at least one of the one or more processors via the at least one of the one or more memories to perform:
receiving user input to add one or more files to an optimized structure; and
for each file in a list of files that are available,
in response to determining that the file is frequently used, automatically adding that file to the optimized structure; and
in response to determining that the file is not frequently used and was previously automatically added to the optimized structure, removing that file from the optimized structure.

17. The computer system of claim 13, wherein the program instructions are stored on the at least one of the one or more storage devices for execution by the at least one of the one or more processors via the at least one of the one or more memories to perform:
for each file in a list of files that are available,
calculating accesses over time; and
updating a ranking of automatically added files based on the calculated accesses and user assigned categories.

18. The computer system of claim 13, wherein the program instructions are stored on the at least one of the one or more storage devices for execution by the at least one of the one or more processors via the at least one of the one or more memories to perform:
in response to determining that block placement is to change, performing automatic reconfiguration.

* * * * *